United States Patent
Iwasaki et al.

(10) Patent No.: US 12,267,926 B2
(45) Date of Patent: Apr. 1, 2025

(54) VEHICULAR LAMP SYSTEM AND VEHICULAR LAMP

(71) Applicant: Ichikoh Industries, Ltd., Isehara (JP)

(72) Inventors: Kazunori Iwasaki, Isehara (JP); Hidemaru Koyano, Isehara (JP); Yuichiro Washi, Isehara (JP); Harumi Mochimaru, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 75 days.

(21) Appl. No.: 18/247,174

(22) PCT Filed: Sep. 30, 2021

(86) PCT No.: PCT/JP2021/036208
§ 371 (c)(1),
(2) Date: Mar. 29, 2023

(87) PCT Pub. No.: WO2022/071507
PCT Pub. Date: Apr. 7, 2022

(65) Prior Publication Data
US 2023/0371150 A1    Nov. 16, 2023

(30) Foreign Application Priority Data
Sep. 30, 2020    (JP) .................................. 2020-166509

(51) Int. Cl.
*H05B 45/50*    (2022.01)
*B60Q 11/00*    (2006.01)
*H05B 45/12*    (2020.01)

(52) U.S. Cl.
CPC ........... *H05B 45/50* (2020.01); *B60Q 11/005* (2013.01); *H05B 45/12* (2020.01)

(58) Field of Classification Search
None
See application file for complete search history.

(56) References Cited

U.S. PATENT DOCUMENTS

2018/0270937 A1    9/2018    Hiegler et al.
2019/0359131 A1*   11/2019   Wama ..................... B60R 11/04

FOREIGN PATENT DOCUMENTS

EP    2 501 206 B1    2/2015
JP    2000-233679 A   8/2000
(Continued)

OTHER PUBLICATIONS

International Search Report issued Nov. 9, 2021 in PCT/JP2021/036208, filed on Sep. 30, 2021, 2 pages.
(Continued)

*Primary Examiner* — Anh Q Tran
(74) *Attorney, Agent, or Firm* — Oblon, McClelland, Maier & Neustadt, L.L.P.

(57) ABSTRACT

To provide a vehicular lamp system and a vehicular lamp which can reduce a replacement frequency of the vehicular lamp. The vehicular lamp system includes a vehicular lamp having a plurality of elements capable of irradiating a corresponding irradiation region with light and a detection unit that detects presence or absence of an abnormality in the plurality of elements, and a notification unit that notifies abnormality information concerning occurrence of an abnormality when the abnormality is detected in a target element capable of irradiating a predetermined irradiation region with light among the plurality of elements.

6 Claims, 7 Drawing Sheets

(56) References Cited

FOREIGN PATENT DOCUMENTS

| | | | |
|---|---|---|---|
| JP | 2004-9825 A | | 1/2004 |
| JP | 2014000908 A | * | 1/2014 |
| JP | 2015-116915 A | | 6/2015 |
| JP | 2017-30536 A | | 2/2017 |
| JP | 2018-86913 A | | 6/2018 |
| JP | 2018-134982 A | | 8/2018 |

OTHER PUBLICATIONS

Office Action issued Dec. 12, 2023, in corresponding Japanese Patent Application No. 2020-166509 (with English Translation), 4 pages.

Extended European Search Report issued Aug. 1, 2024, in corresponding European Patent Application No. 21875803.5, 44 pages.

* cited by examiner

VEHICULAR LAMP SYSTEM AND VEHICULAR LAMP

TECHNICAL FIELD

The present invention relates to a vehicular lamp system and a vehicular lamp.

BACKGROUND ART

Such a vehicular lamp that a plurality of elements such as LED are individually controlled so as to form an ADB light distribution pattern in front of a vehicle is known. As a vehicular lamp system using the vehicular lamp as above, for example, such a configuration is known that detects whether a short circuit, disconnection, or the like has occurred in the plurality of elements, and if a defect is detected, power supply to the vehicular lamp is stopped and all lights are turned off (see Patent Document 1, for example).

CITATION LIST

Patent Literature

PTL 1: Japanese Patent Application Publication No. 2004-9825

SUMMARY OF THE INVENTION

Problems to Be Solved by the Invention

In the vehicular lamp system described above, if a defect is detected even in any one of the plurality of elements, the power supply is uniformly stopped and all the lights are turned off, and the entire vehicular lamp needs to be replaced. Thus, in the above vehicular lamp system, a replacement frequency of vehicular lamp becomes high.

The present invention was made in view of the above and has an object to provide a vehicular lamp system and a vehicular lamp which can reduce the replacement frequency of the vehicular lamp.

Means for Solving the Problem

The vehicular lamp system according to the present invention includes a vehicular lamp having a plurality of elements capable of irradiating a corresponding irradiation region with light and a detection unit that detects presence or absence of an abnormality in the plurality of elements, and a notification unit that notifies abnormality information concerning the occurrence of the abnormality when the abnormality is detected in a target element capable of irradiating, with light, a predetermined irradiation region among the plurality of elements.

When the abnormality is detected in a non-target element that is different from the target element among the plurality of elements, the notification unit may notify the abnormality information in accordance with the detection state of the non-target element in which the abnormality was detected.

The predetermined irradiation region may be a region along a center part in a left-right direction of a horizontal line on a vehicle front view of the pattern.

The vehicular lamp may bring all of the plurality of elements into a non-irradiation state in which light is not emitted to a corresponding plurality of the irradiation regions, when the abnormality is detected in the target element.

The plurality of elements may be disposed so as to be aligned in the left-right direction in the vehicle-mounted state, and the target element may include one or more of the elements disposed at the center part in the left-right direction.

The notification unit is a display device provided in the vehicle, and the abnormality information may be displayed on the display device.

A vehicular lamp according to the present invention includes a plurality of elements capable of irradiating a corresponding irradiation region with light, a detection unit that detects presence or absence of an abnormality in the plurality of elements, and a control unit that brings all of the plurality of elements into a non-irradiation state in which the light is not emitted to the irradiation region when the abnormality is detected in the target element capable of irradiating a predetermined irradiation region with light among the plurality of elements, and continues a state capable of emitting light to the corresponding irradiation region at least for the target element when the abnormality is detected in the non-target element different from the target element among the plurality of elements.

Effect of the Invention

According to the present invention, a vehicular lamp system and a vehicular lamp that can reduce the replacement frequency of the vehicular lamp can be provided.

MODE FOR CARRYING OUT THE INVENTION

Hereinafter, embodiments of a vehicular lamp system and a vehicular lamp according to the present invention will be explained with reference to the drawings. This invention is not limited by the embodiments. In addition, components in the following embodiments include those that are substitutable and easy to be replaced by those skilled in the art, or those that are substantially identical.

First Embodiment

Figure 1:
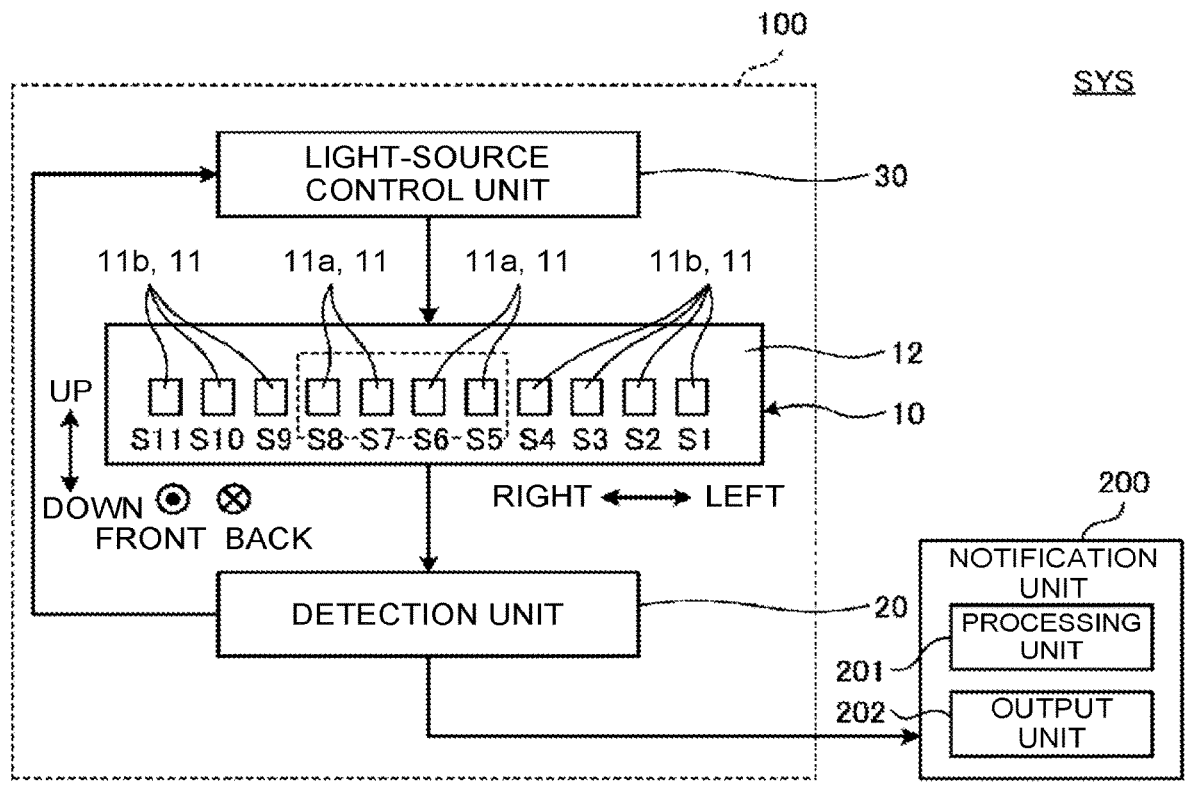
FIG. 1 is a diagram schematically illustrating an example of a vehicular lamp system according to a first embodiment.

FIG. 1 is a diagram schematically illustrating an example of a vehicular lamp system SYS according to a first embodiment. As shown in FIG. 1, the vehicular lamp system SYS includes a vehicular lamp 100 and a notification unit 200. The vehicular lamp 100 has a light source unit 10, a detection unit 20, and a light-source control unit (control unit) 30.

The light source unit 10 has a plurality of elements 11 and a substrate 12. In this embodiment, the plurality of elements 11 are semiconductor-type elements such as LEDs (Light Emitting Diodes), for example. As will be described below, the plurality of elements 11 may be a micro-electro-mechanical system such as a DMD (Digital Micromirror Device).

The plurality of elements 11 are disposed on the substrate 12. The plurality of elements 11 are disposed so as to be aligned in a left-right direction in the vehicle-mounted state, for example. In this embodiment, a configuration in which the plurality of elements 11 are disposed in a single row in the left-right direction on the substrate 12 is explained as an example, but this is not limiting and may be configured to be disposed in a plurality of rows in the left-right direction, as described below. In FIG. 1, a configuration in which 11 pieces of the plurality of elements 11 are disposed is exemplified, for example, but it is not limiting, and the configuration may have 10 or less or 11 or more elements.

Hereinafter, when the plurality of elements 11 are distinguished, they are noted such as the elements S1, S2, S3, . . . and S11 in order from the left side in the vehicle-mounted state, for example. The plurality of elements 11 form a traveling pattern PH in front of the vehicle. In this embodiment, as the traveling pattern PH, a high-beam pattern such as the ADB pattern, for example, is cited.

Figure 2:
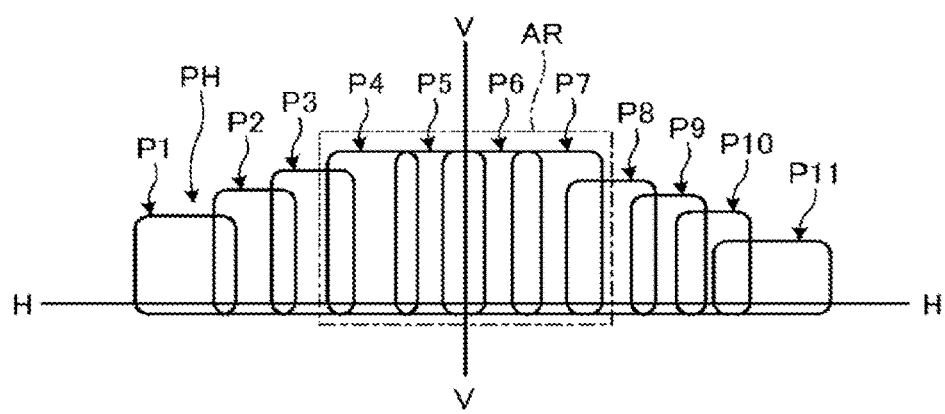
FIG. 2 is a diagram illustrating an example of a traveling pattern formed by a plurality of elements.

FIG. 2 is a diagram illustrating an example of the traveling pattern formed by the plurality of elements 11. When the traveling pattern is shown in FIG. 2 and after, a V-V line indicates a vertical line of a screen and an H-H line indicates a horizontal line in left and right of the screen. The traveling pattern PH is constituted by irradiation regions P1 to P11. The irradiation regions P1 to P11 are formed so that they partially overlap with adjacent irradiation regions in the left-right direction.

A predetermined irradiation region (hereinafter noted as a "predetermined region") AR is set in the traveling pattern PH. The predetermined region AR is set to a major part of the traveling pattern PH, for example. In this embodiment, as the predetermined region AR, the predetermined irradiation region AR is set along the center part in the left-right direction of the horizontal line on the vehicle front view. In this embodiment, the predetermined region AR is the region that includes the irradiation regions P4 to P7. The irradiation region AR is a region requiring irradiation by laws and regulations, or a region contributing to visibility and merchantability set on the basis of the region requiring irradiation by the laws and regulations.

Here, the element S1 shown in FIG. 1 irradiates the irradiation region P1 shown in FIG. 2 with light. Similarly, the element S2 irradiates the irradiation region P2 with light. The element S3 irradiates the irradiation region P3 with light. The element S4 irradiates the irradiation region P4 with light. The element S5 irradiates the irradiation region P5 with light. The element S6 irradiates the irradiation region P6 with light. The element S7 irradiates the irradiation region P7 with light. The element S8 irradiates the irradiation region P8 with light. The element S9 irradiates the irradiation region P9 with light. The element S10 irradiates the irradiation region P10 with light. The element S11 irradiates the irradiation region P11 with light. Thus, the plurality of elements 11 (elements S1 to S11) can irradiate the corresponding plurality of irradiation regions P1 to P11 with light. The plurality of elements 11 can switch between an irradiation state in which light is emitted to the corresponding irradiation regions P1 to P11 and a non-irradiation state in which the light is not emitted to the irradiation regions P1 to P11, respectively. In this embodiment, the irradiation state and the non-irradiation state can be switched by adjusting an electric current supplied to the plurality of elements 11.

In this embodiment, the plurality of elements 11 include target elements 11a and non-target elements 11b. In this embodiment, the element S4 to the element S7 that emit light to the predetermined regions AR (irradiation regions P4 to P7) in the traveling pattern PH are set as the target elements 11a. In this case, in the plurality of elements 11, the element 11 different from the target element 11a is the non-target element 11b. In other words, in this embodiment, the elements S1 to S3 and S8 to S11 that emit light to the irradiation regions P1 to P3 and P8 to P11, which are different from the predetermined regions AR in the left-right direction in the traveling pattern PH, are the non-target elements 11b.

The detection unit 20 detects presence or absence of an abnormality in the plurality of elements 11. The detection unit 20 can detect presence or absence of the abnormality for each of the elements 11 individually. The detection unit 20 outputs detection results to a light-source control unit 30 and the notification unit 200.

The light-source control unit 30 controls the plurality of elements 11. The light-source control unit 30 has a processing unit such as a CPU (Central Processing Unit) and a memory device such as a RAM (Random Access Memory) or a ROM (Read Only Memory). The light-source control unit 30 can individually control the irradiation state and the non-irradiation state for the plurality of elements 11. By controlling the irradiation and non-irradiation of the plurality of elements 11 individually, the elements 11 can be individually brought into the non-irradiation state so as not to emit light to a preceding vehicle, a pedestrian, an oncoming vehicle and the like, for example. As a result, dazzling of the preceding vehicle, the oncoming vehicle and the like can be reduced. When an abnormality is detected in the target element 11a, the light-source control unit 30 brings all of the plurality of elements 11 into the non-irradiation state in which light is not emitted to the irradiation regions P1 to P11. When an abnormality is detected in the non-target element 11b, the light-source control unit 30 continues a state capable of emitting the light to the corresponding irradiation regions P1 to P11 at least for the target element 11a.

When an abnormality is detected in the target element 11a among the plurality of elements 11 on the basis of the detection result of the detection unit 20, the notification unit 200 notifies the abnormality information concerning the occurrence of the abnormality. When an abnormality is detected in the non-target element 11b among the plurality of elements 11, the notification unit 200 can notify the abnormality information according to the detection state of the non-target element 11b in which the abnormality was detected. As the notification unit 200, a display device provided in the vehicle can be cited, for example. In this case, the abnormality information is displayed on a display unit of the display device. As the display device above, a display panel and an indicator light provided on a meter panel, a display panel capable of displaying map information and the like in a car navigation system, a HUD (heads-up display) and the like can be cited.

The notification unit 200 has a processing unit 201 and an output unit 202. The processing unit 201 obtains the detection results and determines whether an abnormality occurred in the plurality of elements 11. If it is determined that an abnormality occurred in one or more of the elements 11, the processing unit 201 determines whether the element 11 in which the abnormality occurred is the target element 11a. If it is determined that the element 11 in which the abnormality occurred is the target element 11a, the processing unit 201 causes the output unit 202 to output the abnormality information.

If the processing unit 201 determines that the element 11 in which the abnormality occurred is the non-target element 11b, it can cause the output unit 202 to output abnormality information according to the detection state of the non-target element 11b in which the abnormality was detected. For example, the processing unit 201 can cause the output unit 202 to output the abnormality information when the detection state of the non-target element 11b meets a predetermined condition. If the detection state of the non-target element 11b does not meet the predetermined condition, the processing unit 201 can cause the output unit 202 not to output the abnormality information.

The detection state of the non-target element 11b includes, for example, a ratio of the number of the non-target elements 11b in which an abnormality was detected to the number of all the non-target elements 11b or all the elements 11. In this case, the processing unit 201 can be configured to cause the output unit 202 to output the abnormality information when the ratio is a threshold value or more, for example.

The detection state of the non-target element 11b includes the number of a plurality of the adjacent non-target elements 11b or a calculated value (such as the ratio described above) calculated on the basis of the number, when an abnormality is detected in the plurality of adjacent non-target elements 11b. In this case, for example, the processing unit 201 can be configured to cause the output unit 202 to output the abnormality information when the number or the calculated value is the threshold value or more.

The detection state of the non-target element 11b includes a distance between the target element 11a and the non-target element 11b in which an abnormality was detected. In this case, for example, the processing unit 201 can be configured to cause the output unit 202 to output the abnormality information when the distance between the non-target element 11b in which the abnormality was detected and the target element 11a is the threshold value or less.

The output unit 202 outputs the abnormality information in response to an instruction from the processing unit 201. When the abnormality information is output from the output unit 202, a driver of the vehicle or the like is notified of the abnormality information. As the output unit 202, a display device provided in the vehicle can be cited, for example. In this case, the abnormality information is displayed on the display device. As the display device as above, a display panel or an indicator light provided on a meter panel, a display panel capable of displaying map information and the like in a car navigation system and the like can be cited. As the output unit 202, it may be a speaker or the like that outputs sound information. In this case, the abnormality information is output as the sound information.

Figure 3:
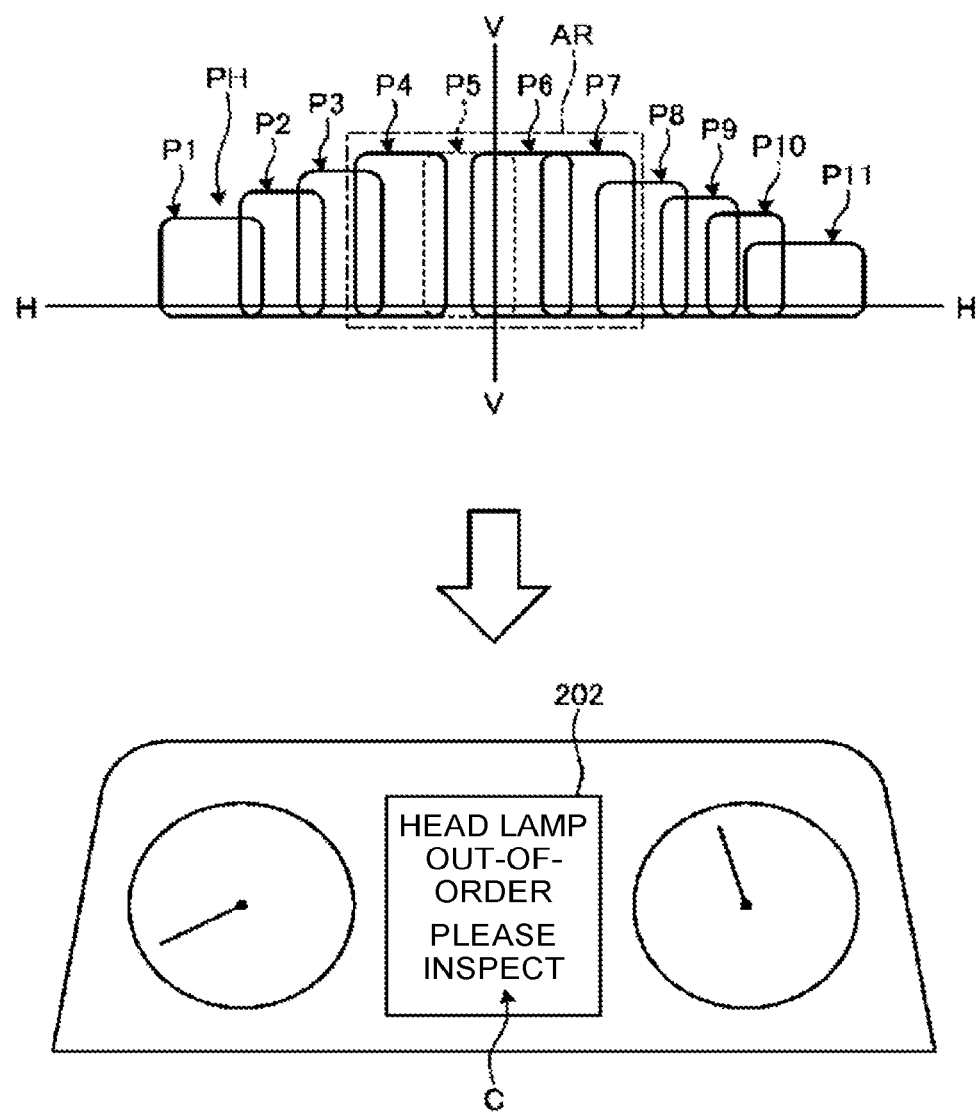
FIG. 3 is a diagram illustrating an example of a case where an abnormality is detected in a target element.

FIG. 3 is a diagram illustrating an example of a case where an abnormality is detected in the target element 11a. As shown in FIG. 3, if an abnormality such as a short circuit or disconnection occurs in the element S5, which is the target element 11a, for example, the element S5 cannot emit light to the irradiation region P5 anymore. Thus, the irradiation region P5 is brought into the state not irradiated with the light.

The detection unit 20 detects that an abnormality occurred in the element S5 and outputs the detection result to the light-source control unit 30 and the notification unit 200. In the notification unit 200, the processing unit 201 determines that an abnormality occurred in the element S5, which is the target element, on the basis of the detection result and causes the output unit 202 to display the abnormality information C. When the abnormality information C is displayed by the output unit 202, the first abnormality information C is notified to the driver of the vehicle or the like. In the example shown in FIG. 3, the notification unit 200 displays information indicating that the vehicular lamp 100 failed and needs inspection as the abnormality information C. When the light-source control unit 30 acquires information that the abnormality occurred in the element S5, it brings all of the plurality of elements 11 into the non-irradiation state in which light is not emitted to the irradiation regions P1 to P11.

Figure 4:
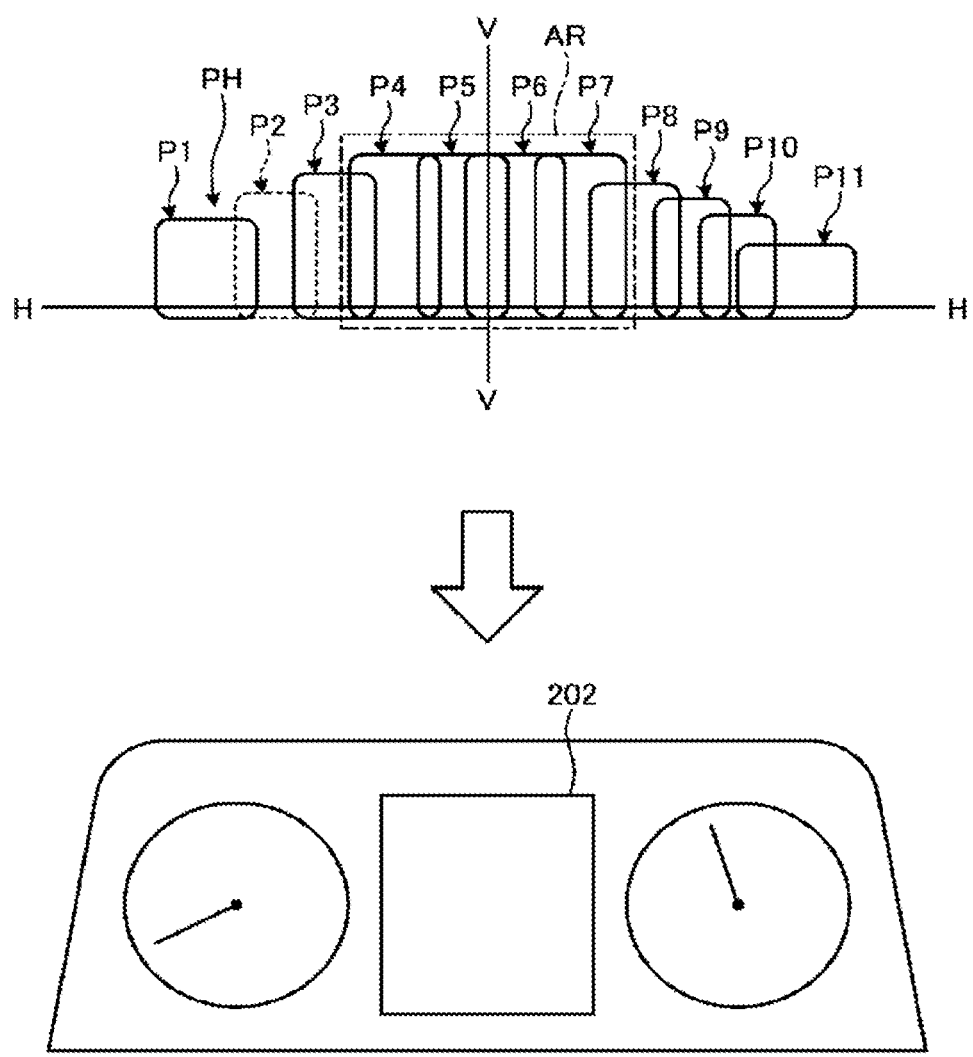
FIG. 4 is a diagram illustrating an example of a case where an abnormality is detected in a non-target element.

FIG. 4 is a diagram illustrating an example of a case where an abnormality is detected in the non-target element 11b. As shown in FIG. 4, if an abnormality such as a short circuit or disconnection occurs in the element S2, which is the non-target element 11b, for example, the element S2 cannot emit light to the irradiation region P2 anymore. Thus, the irradiation region P2 is brought into the state not irradiated with the light.

The detection unit 20 detects that an abnormality occurred in the element S2 and outputs the detection result to the light-source control unit 30 and the notification unit 200. In the notification unit 200, the processing unit 201 determines that an abnormality occurred in the element S2, which is the non-target element 11b, on the basis of the detection result and determines whether the detection state of the element S2 meets the predetermined condition. Here, the predetermined condition is assumed to be, for example, that the ratio of the number of the non-target elements 11b in which the abnormality is detected to the number of all the non-target elements 11b (7 elements) is 20% or more. In this case, in the processing unit 201, since the number of the non-target elements 11b in which an abnormality is detected is one, the aforementioned ratio is approximately 14%, and the predetermined condition is not met. If the processing unit 201 determines that the detection state of the non-target element 11b does not meet the predetermined condition, it can cause the output unit 202 not to output the abnormality information. In this case, the light-source control unit 30 can maintain the plurality of elements 11, including at least the target element 11a, in the irradiation state.

Figure 5:
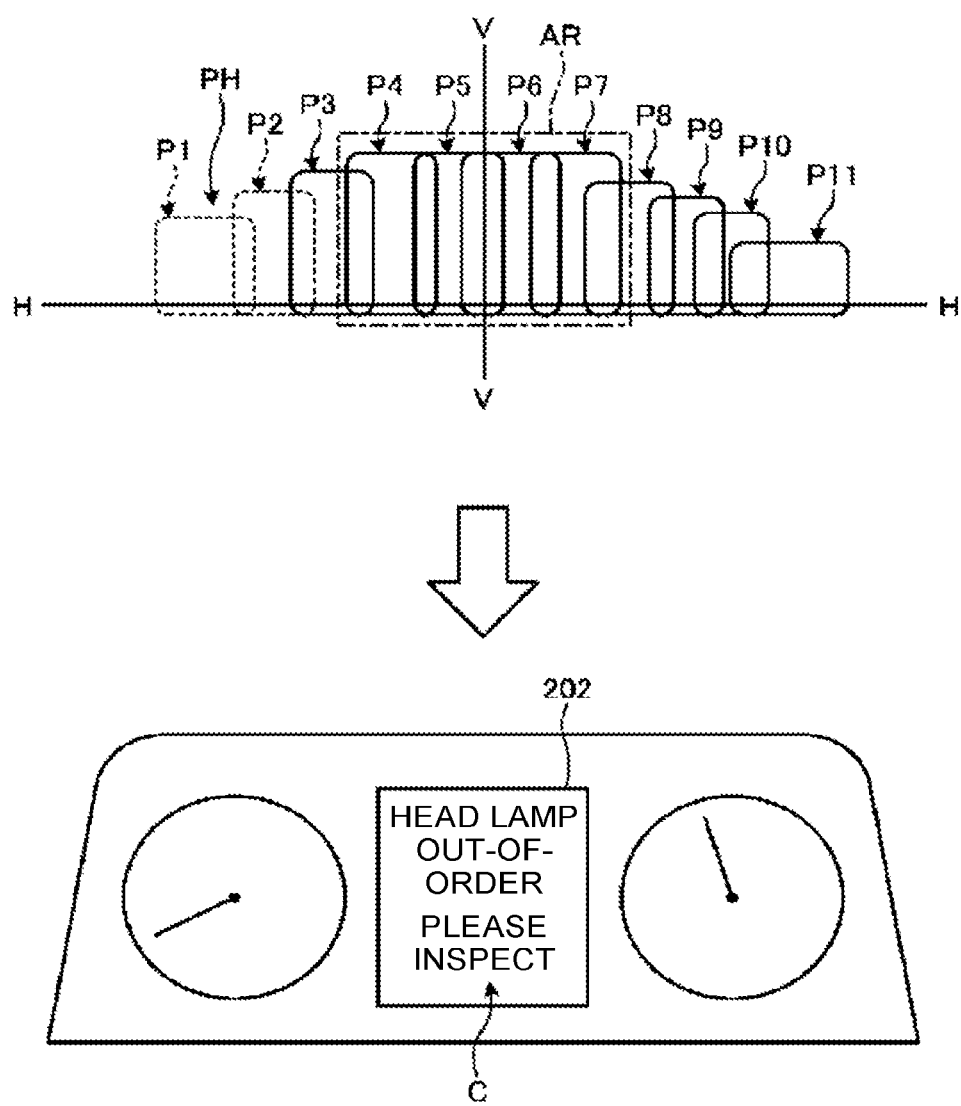
FIG. 5 is a diagram illustrating another example of a case where an abnormality is detected in the non-target element.

FIG. 5 is a diagram illustrating another example of a case where an abnormality is detected in the non-target element 11b. As shown in FIG. 5, if an abnormality such as a short circuit or disconnection occurs in the two elements S1, S2, which are the non-target elements 11b, for example, the elements S1, S2 cannot emit light to the irradiation regions P1, P2 anymore. Thus, the irradiation regions P1, P2 are brought into the state not irradiated with light.

The detection unit 20 detects that an abnormality has occurred in the elements S1, S2 and outputs the detection result to the light-source control unit 30 and the notification unit 200. In the notification unit 200, the processing unit 201 determines that an abnormality occurred in the elements S1, S2, which are the non-target elements 11b, on the basis of the detection results and determines whether the detection states of the elements S1, S2 meet the predetermined condition. Here, the predetermined condition is assumed to be, similarly to the above, that the ratio of the number of the non-target elements 11b in which an abnormality was detected to the number of all the non-target elements 11b (7 elements) is 20% or more. In this case, in the processing unit 201, since the number of the non-target elements 11b in which an abnormality was detected is two, the aforementioned ratio is approximately 28%, and the predetermined condition is met. If the processing unit 201 determines that the detection state of the non-target element 11b meets the predetermined condition, it causes the output unit 202 to output the abnormality information C. Moreover, in this case, the light-source control unit 30 can bring the plurality of elements 11 into the non-irradiation state. In this case, the light-source control unit 30 may execute such control that the irradiation state for the target element 11a is continued and the non-target element 11b is brought into the non-irradiation state, for example.

Figure 6:
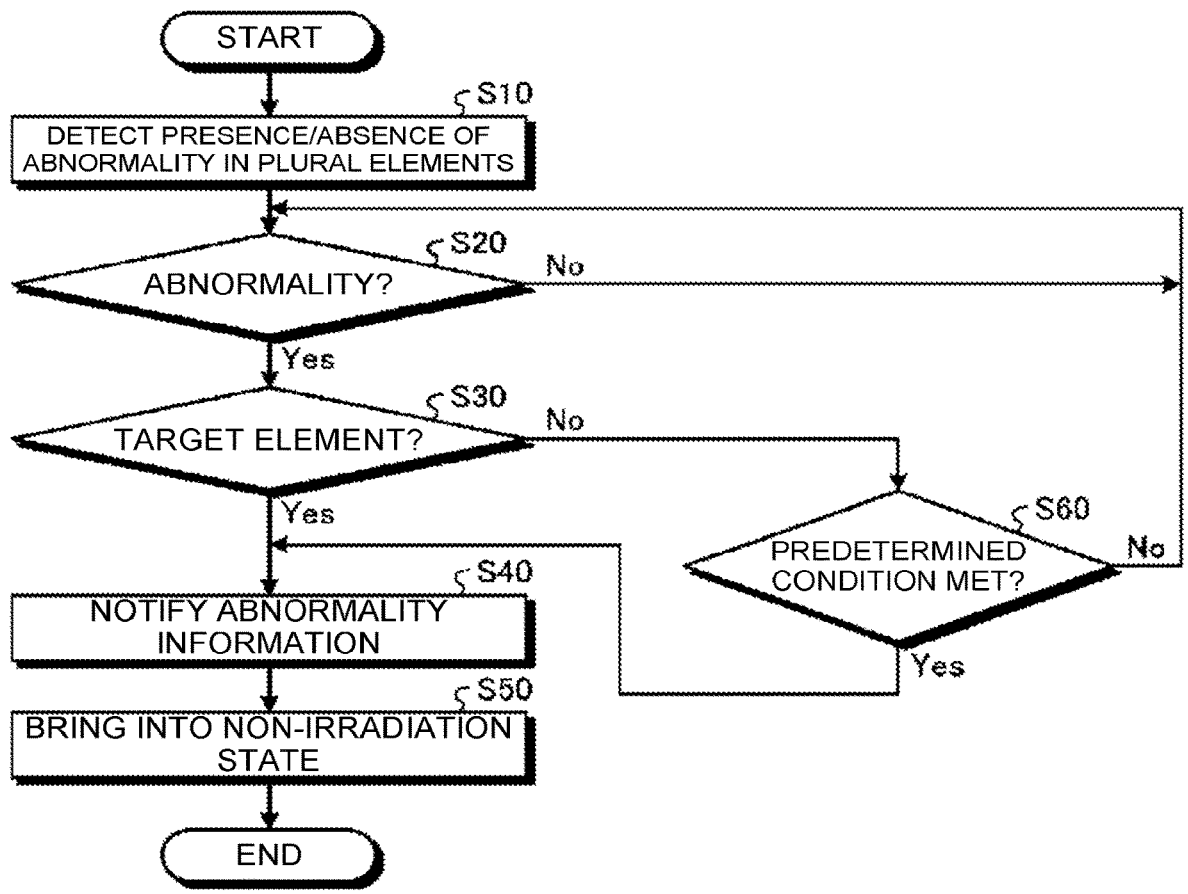
FIG. 6 is a flowchart illustrating an example of an operation of the vehicular lamp system according to the first embodiment.

FIG. 6 is a flowchart illustrating an example of an operation of the vehicular lamp system SYS according to this embodiment. As shown in FIG. 6, the detection unit 20 detects presence or absence of an abnormality in the plurality of elements 11 and outputs the detection results (Step S10). The processing unit 201 detects whether the detection results of the plurality of elements 11 include an abnormality (Step S20). If the processing unit 201 determines that no abnormality is included (No at Step S20), it performs the determination at Step S20 again.

If the processing unit 201 determines that an abnormality is included at Step S20 (Yes at Step S20), it determines whether the target element 11a is abnormal (Step S30). If the processing unit 201 determines that the target element 11a is abnormal at Step S30 (Yes at Step S30), it notifies the abnormality information by causing the output unit 202 to output the abnormality information C (Step S40). The light-source control unit 30 brings all of the plurality of elements 11 into the non-irradiation state (Step S50) and ends the processing.

On the other hand, if the processing unit 201 determines at Step S30 that the target element 11a is not abnormal (No at Step S30), it determines that the non-target element 11b is abnormal and determines whether the detection state of the non-target element 11b meets the predetermined condition (Step S60). If the processing unit 201 determines at Step S60 that the detection state meets the predetermined condition (Yes at Step S60), it executes processing at Step S40 and Step S50. In other words, the processing unit 201 notifies the abnormality information by causing the output unit 202 to output the abnormality information (Step S40), the light-source control unit 30 brings all of the plurality of elements 11 into the non-irradiation state (Step S50) and ends the processing. On the other hand, if the processing unit 201 determines at Step S60 that the detection state does not meet the predetermined condition (No at Step S60), it causes processing at Step S20 and after to be executed.

As described above, the vehicular lamp system SYS according to this embodiment includes the vehicular lamp 100 having a plurality of the elements 11 (S1 to S11) capable of irradiating the corresponding irradiation regions P1 to P11 with light and the detection unit 20 for detecting presence or absence of an abnormality among the plurality of elements 11, and the notification unit 200 for notifying the abnormality information concerning occurrence of the abnormality when the abnormality is detected in the target elements 11a (S4 to S7) capable of irradiating the predetermined irradiation regions AR (P4 to P7) with light among the plurality of elements 11.

According to this configuration, when an abnormality is detected in the target element 11a that irradiates the predetermined region AR with light, the notification unit 200 notifies the abnormality information and causes the vehicular lamp 100 to be replaced and thus, the replacement frequency of the vehicular lamp can be reduced as compared with the configuration in which the vehicular lamp 100 is replaced when an abnormality is detected even in any one of the plurality of elements 11.

In the vehicular lamp system SYS according to this embodiment, when an abnormality is detected in the non-target elements 11b (S1 to S3, S8 to S11) different from the target elements 11a (S4 to S7) among the plurality of elements 11, the notification unit 200 notifies the abnormality information according to the detection state of the non-target element 11b in which the abnormality was detected. As a result, since the notification frequency of the abnormality information can be reduced, the replacement frequency of the vehicular lamp can be reduced.

In the vehicular lamp system SYS according to this embodiment, the predetermined irradiation region AR is the region along the center part in the left-right direction of the horizontal line on the vehicle front view in the traveling pattern PH. As a result, if an abnormality occurs in the element 11 that irradiates the main part of the traveling pattern PH with light, the abnormality can be reliably notified.

In the vehicular lamp system SYS according to this embodiment, when an abnormality is detected in the target element 11a, the vehicular lamp 100 brings all of the plurality of elements 11 into the non-irradiation state in which the light is not emitted to the corresponding plurality of irradiation regions P1 to P11. As a result, power consumption can be reduced when an abnormality is detected in the target element 11a.

In the vehicular lamp system SYS according to this embodiment, the plurality of elements 11 are disposed so as to be aligned in the left-right direction in the vehicle mounted state, and the target elements 11a include one or more elements disposed at the center part in the left-right direction. As a result, a correspondence relationship between the target element 11a and the irradiation region can be grasped easily.

In the vehicular lamp system SYS according to this embodiment, the notification unit 200 is a display device provided in the vehicle, and the abnormality information is displayed on the display device. As a result, the abnormality information can be visually notified to the drivers and the like.

The vehicular lamp 100 according to this embodiment includes the plurality of elements 11 (S1 to S11) capable of emitting the light to the corresponding irradiation regions P1 to P11, the detection unit 20 which detects presence or absence of an abnormality of the plurality of elements 11, and the light-source control unit 30 which brings all of the plurality of elements 11 into the non-irradiation state in which the light is not emitted to the irradiation regions P1 to P11, when an abnormality is detected in the target element 11a, and continues the state capable of emitting the light to the corresponding irradiation regions P1 to P11 at least for the target element 11a, when the abnormality is detected in the non-target element 11b different from the target element 11a. With this configuration, when an abnormality is detected in the non-target element 11b, the state capable of irradiation is continued at least for the target element 11a. For example, as the configuration explained in this embodiment, when the traveling pattern PH is formed by dividing it into a large number of segments, even if there is an abnormality in one segment other than the predetermined region AR, an influence on the entire traveling pattern PH may be small in some cases. In such a case, by continuing the state capable of irradiation at least for the target element 11a, the visibility of the driver can be improved as compared with a configuration in which all the elements 11 are turned off, which can contribute to safety.

Second Embodiment

Figure 7:
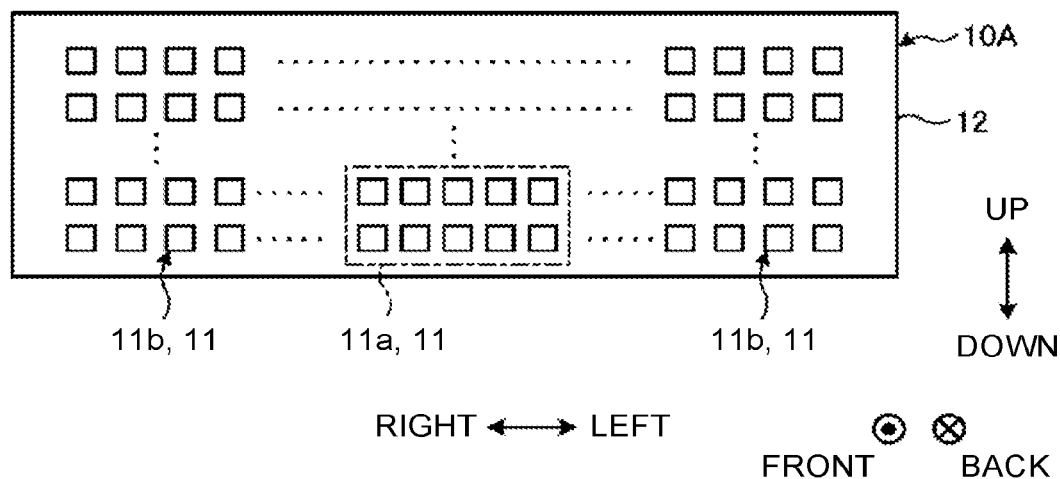
FIG. 7 is a diagram schematically illustrating an example of a light source unit of a vehicular lamp system according to a second embodiment.

FIG. 7 is a diagram schematically illustrating an example of a light source unit of a vehicular lamp system SYS2 according to a second embodiment. In the vehicular lamp system SYS2 according to the second embodiment, the configuration of the light source unit 10A is different from that of the light source unit 10 of the first embodiment, while the other configurations are the same as those in the first embodiment. Hereinafter, the configuration of the light source unit 10A will be mainly explained. The light source unit 10A has a plurality of the elements 11 and the substrate 12. In the light source unit 10A, the plurality of elements 11 are disposed in a matrix on the substrate 12 along the left-right direction and the up-down direction. The configuration of each of the elements 11 is the same as that in the first embodiment.

Figure 8:
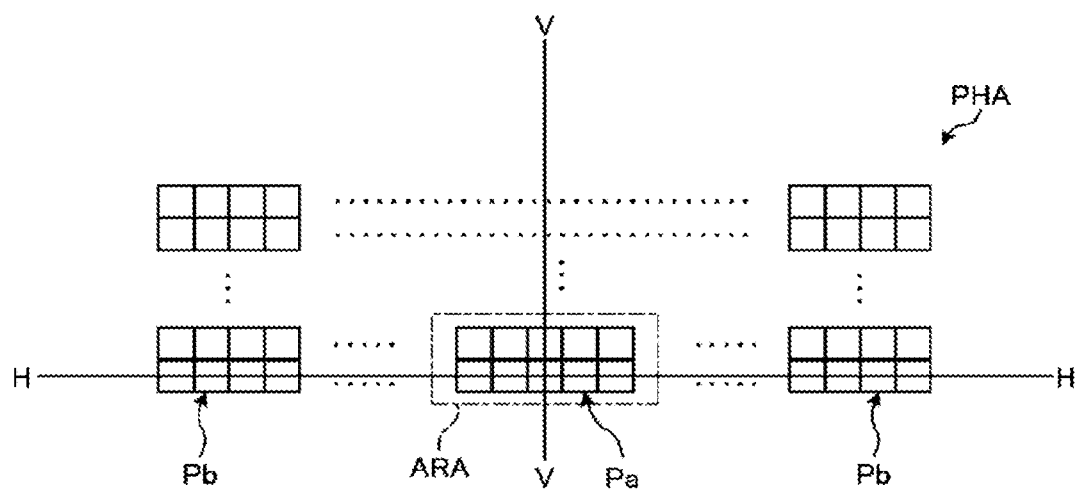
FIG. 8 is a diagram illustrating another example of the traveling pattern formed by the plurality of elements.

FIG. 8 is a diagram illustrating another example of a traveling pattern formed by the plurality of elements 11. The traveling pattern PHA has an irradiation region P formed in a matrix along the horizontal direction and the vertical direction. One irradiation region P is formed by one element 11. It corresponds to each of the plurality of elements 11. Each of the irradiation regions P is formed so that it is in contact with or partially overlaps with the irradiation regions P which are adjacent in the left-right direction and the up-down direction.

The disposition of the plurality of elements 11 shown in FIG. 7 and the disposition of the plurality of irradiation regions P shown in FIG. 8 correspond to each other at positions. The plurality of elements 11 can be individually controlled in the irradiation state and the non-irradiation state, as in the above embodiment. In the modes shown in FIG. 7 and FIG. 8, the traveling pattern PHA is more finely divided than in the above embodiment. Therefore, as compared with the above embodiment, a formation range of the traveling pattern PHA in front of the vehicle can be controlled with high definition.

The plurality of elements 11 are distinguished into the target elements 11a and the non-target elements 11b. For example, the element that forms the predetermined region AR along the center part in the left-right direction of the horizontal line on the vehicle front view of the traveling pattern PHA is the target element 11a. The target element 11a is disposed at the center part in the left-right direction and at a lowermost part of the up-down direction among the plurality of elements 11 disposed in the matrix. The non-target element 11b is disposed in the periphery of the target element 11a, that is, on both sides in the left-right direction and on an upper side in the up-down direction of the target element 11a.

In this configuration, the detection unit 20 detects presence or absence of an abnormality in the plurality of elements 11, as in the above embodiment. The detection unit 20 can detect presence or absence of the abnormality for each of the elements 11 individually. The detection unit 20 outputs detection results to a light-source control unit 30 and the notification unit 200.

When an abnormality is detected in the target element 11a among the plurality of elements 11 on the basis of the detection result of the detection unit 20, the notification unit 200 notifies the abnormality information concerning the occurrence of the abnormality. When an abnormality is detected in the non-target element 11b among the plurality of elements 11, the notification unit 200 can notify the abnormality information according to the detection state of the non-target element 11b in which the abnormality was detected.

As in the first embodiment, the detection state of the non-target elements 11b includes the ratio of the number of the non-target elements 11b in which an abnormality is detected to the number of all the non-target elements 11b or all the elements 11. When an abnormality is detected in a plurality of the adjacent non-target elements 11b, the detection state of the non-target element 11b includes the number of the plurality of adjacent non-target elements 11b or a calculated value (such as the ratio described above) calculated on the basis of the number. In this case, the adjacent directions can be both or either one of the left-right direction and the up-down direction. The detection state of the non-target element 11b includes a distance between the target element 11a and the non-target element 11b in which an abnormality was detected. In this case, as the target element 11a to be a reference for calculating the distance, one target element 11a may be set as a reference in advance, or the element 11 disposed at a distance the closest to the non-target element 11b in which an abnormality was detected may be used as a reference, for example.

Similarly to the first embodiment, when an abnormality is detected in the target element 11a, the light-source control unit 30 brings all of the plurality of elements 11 into the non-irradiation state in which light is not emitted to the irradiation regions P1 to P11, and when an abnormality is detected in the non-target element 11b different from the target element 11a, it continues the state capable of emitting the light to the corresponding irradiation regions P1 to P11 at least for the target element 11a.

As described above, in the vehicular lamp system SYS2 according to the second embodiment, in the configuration in which a plurality of the elements 11 are disposed in the matrix in the left-right direction and the up-down direction, that is, in the configuration in which the number of the elements 11 is larger than that in the configuration of the first embodiment, it is configured such that, when an abnormality is detected in the target element 11a, the notification unit 200 notifies the abnormality information. As a result, since the notification frequency of the abnormality information can be reduced as compared with the configuration in the first embodiment, the replacement frequency of the vehicular lamp 100 can be further reduced. In addition, as compared with the configuration in which the vehicular lamp 100 is replaced when an abnormality is detected even in any one of the plurality of elements 11, the replacement frequency of the vehicular lamp 100 can be further reduced and thus, costs due to the replacement of the vehicular lamp 100 can be further suppressed.

In the configuration in which the number of the elements 11 is larger than that in the configuration of the first embodiment, when an abnormality is detected in the target element 11a, the vehicular lamp 100 according to the second embodiment brings all of the plurality of elements 11 into the non-irradiation state in which light is not emitted to the irradiation regions P1 to P11, and when an abnormality is detected in the non-target element 11b different from the target element 11a, it continues the state capable of emitting the light to the corresponding irradiation regions P1 to P11 at least for the target element 11a. When the traveling pattern PH is formed by dividing it into a large number of segments as described above, even if there is an abnormality in one segment other than the predetermined region AR, an influence on the entire traveling pattern PH may be small in some cases. In such a case, by continuing the state capable of irradiation at least for the target element 11a, the visibility of the driver can be improved as compared with a configuration in which all the elements 11 are turned off, which can contribute to safety.

The technical scope of the present invention is not limited to the above embodiment, and changes may be made as appropriate within a range not departing from the gist of the present invention. For example, in the first embodiment and the second embodiment described above, a semiconductor-type element was explained as an example of the element 11, but it is not limiting and may be a micro-electromechanical system such as a DMD.

Figure 9:
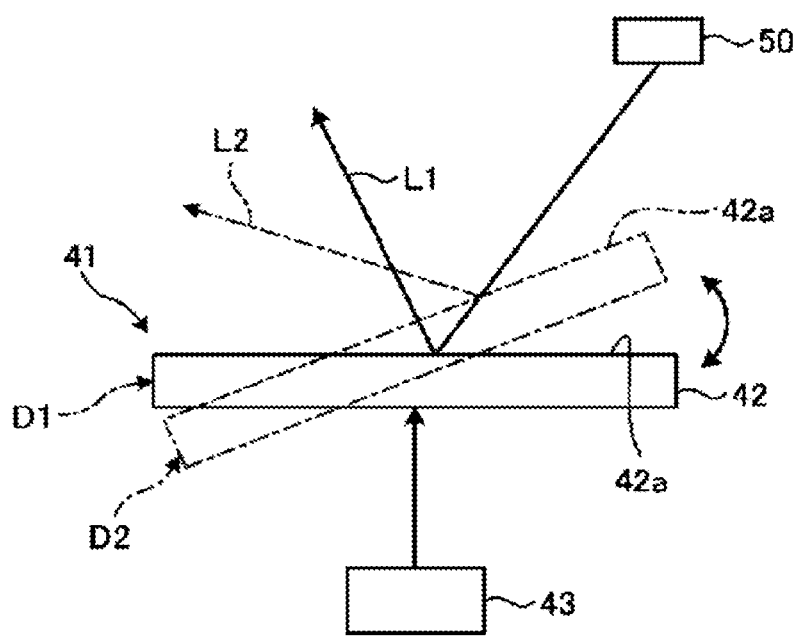
FIG. 9 is a diagram schematically illustrating a configuration of the element according to a variation.

FIG. 9 is a diagram schematically illustrating a configuration of the element according to a variation. As shown in FIG. 9, an element 41 has a reflective member 42 and a drive unit 43 that switches a posture of the reflective member 42. The reflective member 42 has a reflective surface 42a. The reflective surface 42a reflects light from a light source 50. The drive unit 43 changes a direction of reflected light reflected on the reflective surface 42a by switching the posture of the reflective member 42.

For example, the drive unit 43 can switch the posture of the reflective member 42 between a first posture D1 and a second posture D2. The first posture D1 is the posture in which the reflective surface 42a reflects light from the light source 50 toward the corresponding irradiation region in front of the vehicle. The second posture D2 is the posture in which the reflective surface 42a reflects light from the light source 50 toward a direction different from the irradiation region described above.

By setting the posture of the reflective member 42 to the first posture D1 by the drive unit 43, the light from the light source 50 is reflected on the reflective surface 42a, and reflected light L1 is emitted to a predetermined irradiation region. By setting the posture of the reflective member 42 to the second posture D2 by the drive unit 43, the light from the light source 50 is reflected on the reflective surface 42a, and reflected light L2 is emitted to a direction different from the predetermined irradiation region above. In this case, the predetermined irradiation region is not irradiated with light. As described above, by adjusting the posture of the reflective member 42 by the drive unit 43, the irradiation state in which light is emitted to the irradiation region and the non-irradiated state in which light is not emitted to the irradiation region can be switched.

The elements 41 as above may be used in a state in which they are disposed in one row along the left-right direction as in the configuration shown in the first embodiment, or they may be used in a matrix state in which they are disposed along the left-right direction and the up-down direction as in the configuration shown in the second embodiment.

In the above embodiment, the case in which the determination as to whether the element 11 in which the abnormality occurred is the target element 11a and the determination as to whether the detection state of the non-target element 11b meets the predetermined conditions are made in the processing unit 201 of the notification unit 200 was explained as an example, but this is not limiting. It may be so configured that either one of or both of the above two determinations may be made on the vehicular lamp 100 side, and the determination results may be transmitted to the notification unit 200 side along with the detection results, for example.

DESCRIPTION OF REFERENCE NUMERALS

C Abnormality information
L1, L2 Reflected light
AR Predetermined region
P1 TO P11 Irradiation region
PH, PHA Traveling pattern
SYS, SYS2 Vehicular lamp system
10, 10A Light source unit
11, 41 Element
11a Target element
11b Non-target element
12 Substrate
20 Detection unit
30 Light-source control unit
42 Reflective member
42a Reflective surface
43 Drive unit
50 Light source
100 . . . Vehicular lamp
200 Notification unit
201 Processing unit
202 Output unit

The invention claimed is:

1. A vehicular lamp system, comprising:
a vehicular lamp having a plurality of elements capable of irradiating a corresponding irradiation region with light and a detection unit that detects presence or absence of an abnormality in the plurality of elements; and
a notification unit that notifies abnormality information concerning occurrence of the abnormality when the abnormality is detected in a target element capable of irradiating, with light, a predetermined irradiation region among the plurality of elements, wherein
the predetermined irradiation region is a region along a center part in a left-right direction of a horizontal line on a vehicle front view of the pattern.

2. The vehicular lamp system according to claim 1, wherein
when the abnormality is detected in a non-target element that is different from the target element among the plurality of elements, the notification unit notifies the abnormality information in accordance with a detection state of the non-target element in which the abnormality was detected.

3. The vehicular lamp system according to claim 1, wherein
when the abnormality is detected in the target element, the vehicular lamp brings all of the plurality of elements into a non-irradiation state in which no light is emitted to a corresponding plurality of the irradiation regions.

4. A vehicular lamp system, comprising:
a vehicular lamp having a plurality of elements capable of irradiating a corresponding irradiation region with light and a detection unit that detects presence or absence of an abnormality in the plurality of elements; and
a notification unit that notifies abnormality information concerning occurrence of the abnormality when the abnormality is detected in a target element capable of irradiating, with light, a predetermined irradiation region among the plurality of elements, wherein
the plurality of elements are disposed so as to be aligned in a left-right direction in a vehicle mounted state; and the target element includes one or more of the elements disposed at a center part in the left-right direction.

5. The vehicular lamp system according to claim 1, wherein
the notification unit is a display device provided in the vehicle; and
the abnormality information is displayed on the display device.

6. A vehicular lamp, comprising:
a plurality of elements capable of irradiating a corresponding irradiation region with light;
a detection unit that detects presence or absence of an abnormality in the plurality of elements; and
a control unit that brings all of the plurality of elements into a non-irradiation state in which the light is not emitted to the irradiation region when the abnormality is detected in a target element capable of irradiating a predetermined irradiation region with light among the plurality of elements, and continues a state capable of emitting light to the corresponding irradiation region at least for the target element when the abnormality is detected in a non-target element different from the target element among the plurality of elements.

* * * * *